(12) United States Patent
Uchikawa (10) Patent No.: US 7,752,454 B2
(45) Date of Patent: Jul. 6, 2010

(54) INFORMATION PROCESSING APPARATUS, INFORMATION PROCESSING METHOD, AND STORAGE MEDIUM

(75) Inventor: Shinichi Uchikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 975 days.

(21) Appl. No.: 11/151,941

(22) Filed: Jun. 14, 2005

(65) Prior Publication Data
US 2006/0005044 A1    Jan. 5, 2006

(30) Foreign Application Priority Data
Jun. 30, 2004    (JP) .............................. 2004-193472

(51) Int. Cl.
*G06F 11/30* (2006.01)
*G06F 12/14* (2006.01)
(52) U.S. Cl. ............................ 713/189; 713/168; 726/5
(58) Field of Classification Search .................. 713/168, 713/189
See application file for complete search history.

(56) References Cited

U.S. PATENT DOCUMENTS

| 7,325,132 | B2 * | 1/2008 | Takayama et al. ........... 713/168 |
| 2003/0051147 | A1 | 3/2003 | Maeda |
| 2003/0105887 | A1 * | 6/2003 | Cox et al. .................... 709/328 |
| 2003/0226017 | A1 * | 12/2003 | Palekar et al. ............... 713/168 |
| 2004/0049684 | A1 * | 3/2004 | Nomura et al. .............. 713/182 |
| 2007/0294753 | A1 * | 12/2007 | Tanaka et al. .................. 726/9 |

FOREIGN PATENT DOCUMENTS

| JP | 2003-084929 A | 3/2003 |
| JP | 2003-296085 A | 10/2003 |

OTHER PUBLICATIONS

Von Hoff T.P., Crevatin, M. HTTP Digest Authentication in Embedded Automation Systems.Emerging Technologies and Factory Automation 2003.Proceedings vol. 1 pp. 390-397; IEEE Conference, Sep. 2003.
"A handbook for fully understanding networks", ASCII vol. 28 No. 1, Japan, ASCII Co., Ltd., Jan. 1, 2004, vol. 28 No. 1, p. 56-59.

* cited by examiner

*Primary Examiner*—Nasser Moazzami
*Assistant Examiner*—Fikremariam Yalew
(74) *Attorney, Agent, or Firm*—Canon U.S.A., Inc., IP Division (57) ABSTRACT

There is provided an information processing apparatus which can communicate data between an external apparatus, including a setting unit for setting up condition of encryption communication in a case of communicating with the external apparatus, in accordance with designation from a user, and a selecting unit for selecting one of a plurality of authentication methods, which is used by authentication processing performed between the external apparatus, in accordance with the setting condition.

13 Claims, 12 Drawing Sheets

| URI Path | Protocol | Port | File/Service | Auth | Auth Mode | Authentication (user, pass) |
|---|---|---|---|---|---|---|
| /test.txt | HTTP | 80 | /FILE/test.txt | ON | Basic | test, himitu |
| /image.gif | HTTP | 80 | /FILE/Pic/image.gif | OFF | None | |
| /ipp | HTTPS | 443 | IppService() | ON | Digest | uchikawa, kimitu |
| /bmlinks | HTTP | 443 | BmlinksService() | ON | Digest | Kigyou, himitu |
| .. | .. | .. | .. | .. | .. | .. |

| URI Path | Protocol | Port | File/Service | Auth | Authentication (user, pass) |
|---|---|---|---|---|---|
| /test.txt | HTTP | 80 | /FILE/test.txt | ON | test, himitu |
| /image.gif | HTTP | 80 | /FILE/Pic/image.gif | OFF | |
| /ipp | HTTPS | 443 | IppService() | ON | uchikawa, kimitu |
| /bmlinks | HTTP | 443 | BmlinksService() | ON | Kigyou, himitu |
| ⋮ | ⋮ | ⋮ | ⋮ | ⋮ | ⋮ |

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus, an information processing method, and a storage medium and selection of an authentication method for communication of data with an external apparatus.

2. Description of the Related Art

Conventionally, when information processing apparatuses offered public presentation of information and services, authentication processing by the information processing apparatus was performed. In performing authentication processing, the authentication method used for authentication processing has to be chosen (except for a setup of the account information of a user name, a password, etc.).

For example, in the image processing apparatus disclosed in Japanese Patent Laid-Open No. 2003-084929 and Japanese Patent Laid-Open 2003-296085, the user set up the authentication method to be used.

In the authentication processing in which a server provides service to the partner via a network, suppose that there are two authentication methods which can be selected, a Basic authentication method and a Digest authentication method, for example.

The Basic authentication method is one in which the user authentication technology uses HTTP (Hyper Text Transfer Protocol), and the authentication information (user name and password) is transmitted over a network without being encrypted. By not encrypting the data transmitted over the network, the processing load in Basic authentication processing is reduced.

The Digest authentication method is one in which the user authentication technology uses HTTP, and the authentication information (user name and password) is encrypted and the encrypted authentication information is transmitted over the network. Therefore, even when a third party is watching the network, the danger that the authentication information will be decoded by the third party is reduced. There is added value that not only authentication but full protection of a message, a falsification check, and server authentication are realizable using the Digest authentication method. However, since it is necessary to encrypt authentication information and the Digest value of a message which transmits at every communication, the processing load in Digest authentication processing is increased.

Although it is useful that a server can support both of the types of authentication methods, the administrator who manages a server has to select an authentication method. Such a selection may be difficult for the administrator not only because the administrator must decide which method to use for a given user, but also because the administrator may not have the technical knowledge of each authentication method in order to make the proper selection.

In the two kinds of authentication methods described above, there are differences in whether encryption is performed and in the size of processing load. The effect of the selected authentication method changes based on whether encrypted communication is used between an information processor and its partner over the network.

Figure 12:
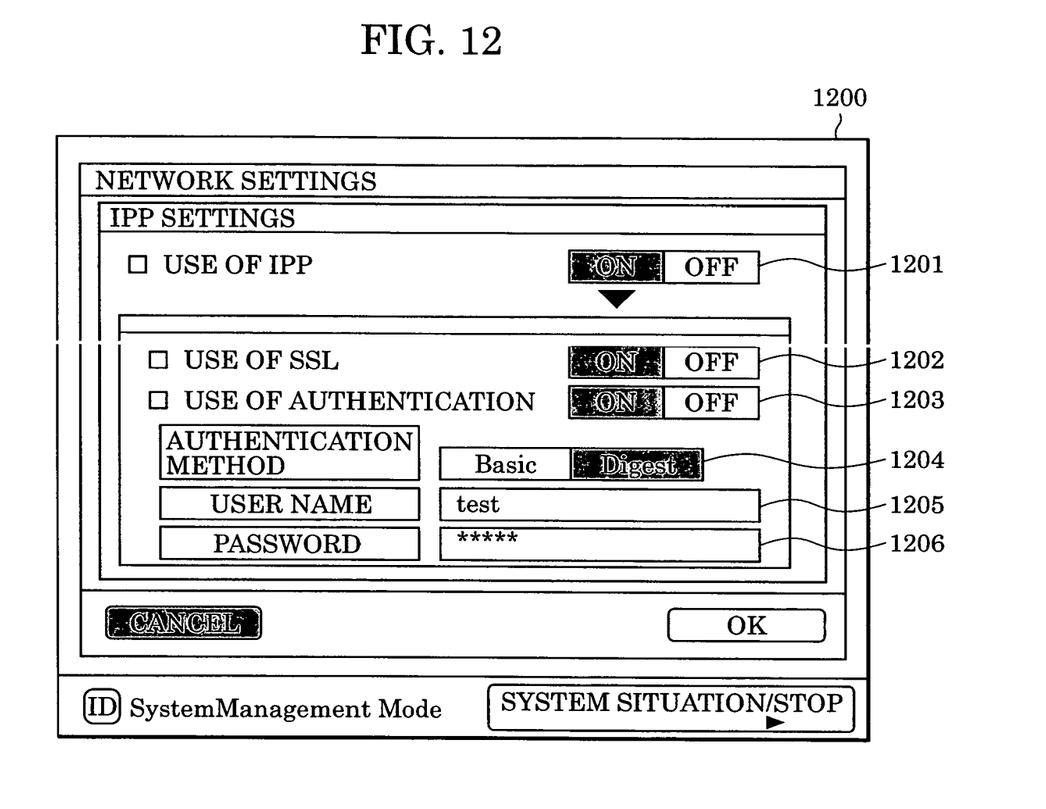
FIG. 12 shows an example of an authentication setting screen for selection of the authentication processing which is performed by a server.

FIG. 12 is a figure showing an example of an authentication setting screen 1200 for the authentication processing performed by a server. A server displays the authentication setting screen 1200 via a display etc., and a user performs a setup about a server's authentication function in this setting screen. As an example, in the exemplary setting screen 1200, the authentication processing can be performed by a server providing IPP (Internet Printing Protocol) service to a client PC (client personal computer).

A protocol button 1201 is used for selecting whether the IPP service in the server is used. When "ON" is selected, the IPP service is provided in the server, and when "OFF" is selected, the IPP service is no longer provided in the server.

When IPP service is provided, an SSL button 1202 is provided for selecting whether communication uses HTTP and SSL (Secure Sockets layer) (in cases where "ON" is selected), or only HTTP (in cases where "OFF" is selected). When the server provides IPP service for the client PC and the user selects the communication only using HTTP, the encryption communication by SSL is no longer performed between the server and the client PC.

Authentication button 1203 is a button for selecting whether authentication is to be performed (in cases where "ON" is selected) or authentication is not to be performed (in cases where "OFF" is selected), when the user uses the IPP service from the client PC.

Authentication method button 1204 is a button for selecting whether the Basic authentication method or the Digest authentication method is used as an authentication method.

Name box 1205 and password box 1206 are boxes for entering a user name and password, respectively, which are used for authentication.

In the Digest authentication method, in order to prevent the outflow by tapping of authentication information, including a user name, a password, etc., in authentication processing, the Digest value of authentication information is computed and the Digest value is used for authentication. Therefore, the processing which computes the Digest value of authentication information is required. Since it is necessary to compute the Digest value of the whole message when using completeness protection (method which includes the alteration prevention function of transmitting/receiving a message in addition to authentication) which is an expanded function of Digest authentication, the processing load becomes even higher. Therefore, it is better to select the Basic authentication method, in order to reduce the processing load. However, when a user does not know the technical contents of the authentication method, a Digest authentication method may be selected.

On the other hand, when the communication using only HTTP (not SSL) is selected, the Basic authentication method will transmit authentication information, without encrypting the user name and password.

SUMMARY OF THE INVENTION

In view of the above problems in the conventional art, the present invention provides an information processing apparatus which can select a suitable authentication method without requiring a user to perform a selection process of the authentication.

According to an aspect of the present invention, an information processing apparatus can communicate with an external apparatus includes: a setting unit adapted to set up an encryption communication condition for encryption communication with the external apparatus based on a designation from a user; and a selecting unit adapted to select one of a plurality of authentication methods used by authentication processing for communication with the external apparatus in accordance with the encryption communication condition set by the setting unit.

According to another aspect of the present invention, an information processing apparatus that can communicate with an external apparatus includes: a receiving unit adapted to receive data from the external apparatus; a determination unit adapted to determine whether the data received by the receiving unit was communicated using encryption communication; and a selecting unit adapted to select one of a plurality of authentication methods to be used in authentication processing performed for communication with the external apparatus based on whether the data received by the receiving unit was communicated using encryption communication as determined by the determination unit.

Other features and advantages of the present invention will be apparent from the following description taken in conjunction with the accompanying drawings, in which like reference characters designate the same or similar parts throughout the figures thereof.

DESCRIPTION OF THE EMBODIMENTS

An embodiment of the present invention is described below with reference to the accompanying drawings.

Figure 1:
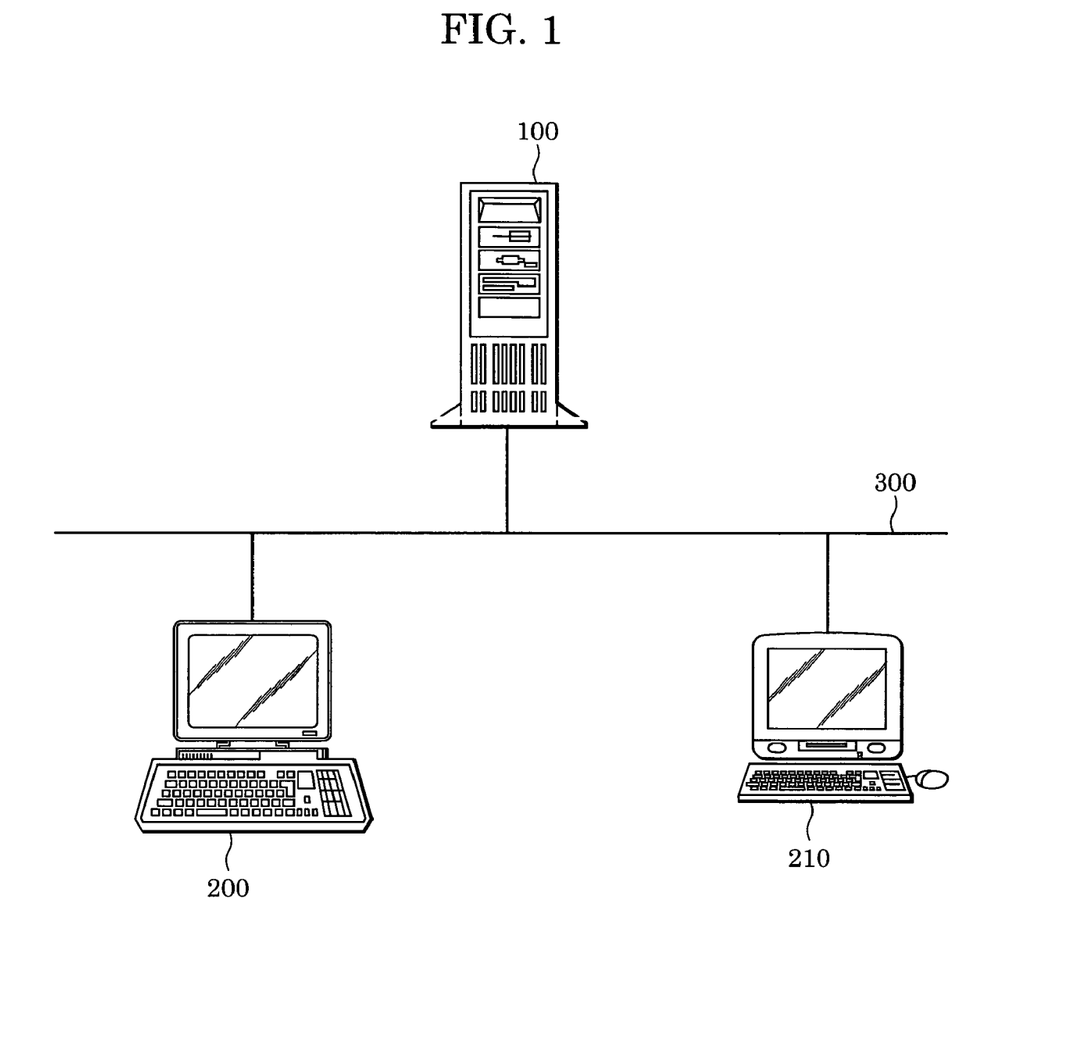
FIG. 1 shows an example configuration of the system of the present invention.

FIG. 1 shows an exemplary configuration of the system of the present invention.

A WEB server system (referred to herein as "a WEB server") 100 is a server system provided with an authentication setting system function. The WEB server 100 provides a distribution service of data which needs authentication. The WEB server 100 also performs the authentication. The WEB server 100 may be mounted with image processing apparatuses, such as a printer and an MFP (Multi-Function Printer).

Client PCs 200 and 210 are personal computers that uses services of the WEB server. The WEB server 100, and the client PCs 200 and 210 are connected via a network 300. The network 300 may be, for example, a cable network or a radio network, for example, a wireless LAN.

Figure 2:
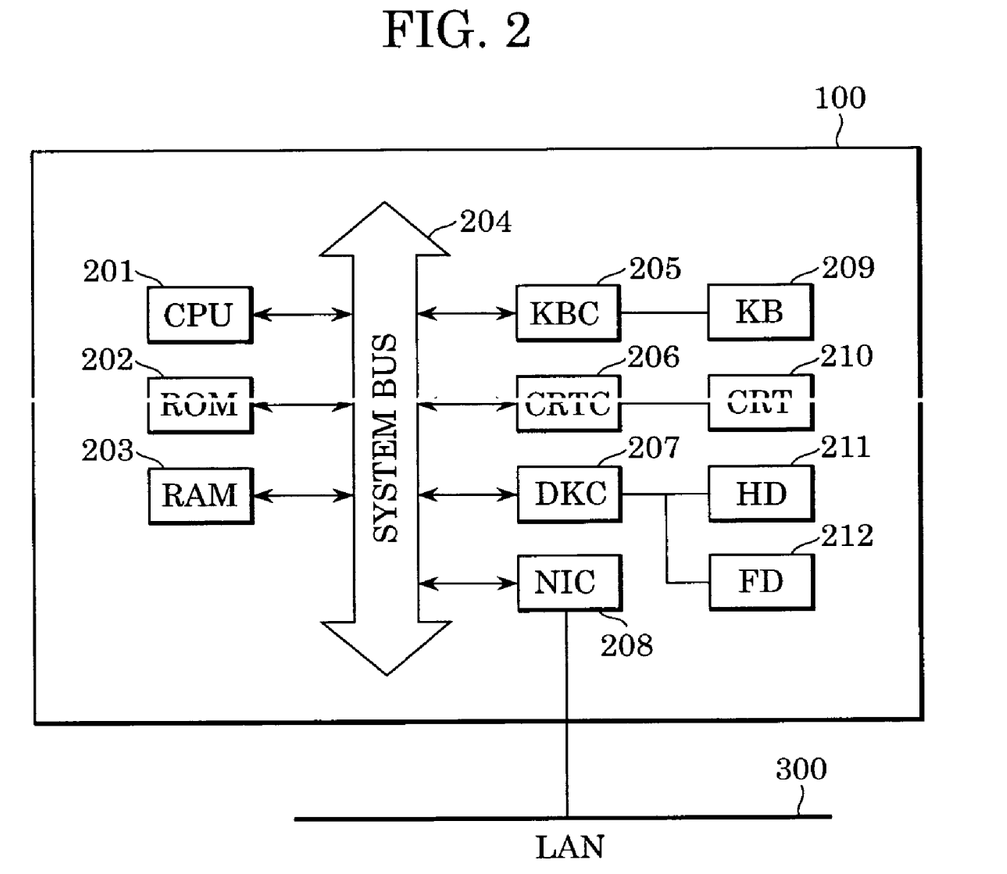
FIG. 2 shows an exemplary hardware configuration of the WEB server shown in FIG. 1.

FIG. 2 shows an exemplary hardware configuration of the WEB server 100.

The WEB server 100 has the same configuration as a general PC. That is, the WEB server 100 includes a central processing unit (CPU) 201 which performs various functions by executing software which was stored in a read-only memory (ROM) 202 or a hard disk (HD) 211, or is supplied to the CPU from a floppy disk via a floppy disk drive (FD) 212. The CPU 201 controls each part connected to a system bus 204.

A random access memory (RAM) 203 functions as the main memory of CPU 201, a work area, etc. A keyboard controller (KBC) 205 controls input from a keyboard (KB) 209, a pointing device (not shown), etc. A CRT (cathode ray tube) controller (CRTC) 206 controls a CRT display (CRT) 210.

A disk controller (DKC) 207 controls access to the HD 211 and the FD 212 which store a boot program, a distributed system server program, various applications, an edit file, a user file, etc. A network interface card (NIC) 208 performs two-way communication of data between a network printer, other network equipment, or other PCs through a local area network (LAN) 300.

In the case where the WEB server 100 is an image processing apparatus, such as a printer or an MFP, a control panel is provided instead of the CRT 210 and control keys are provided instead of the KB 209.

Figure 3:
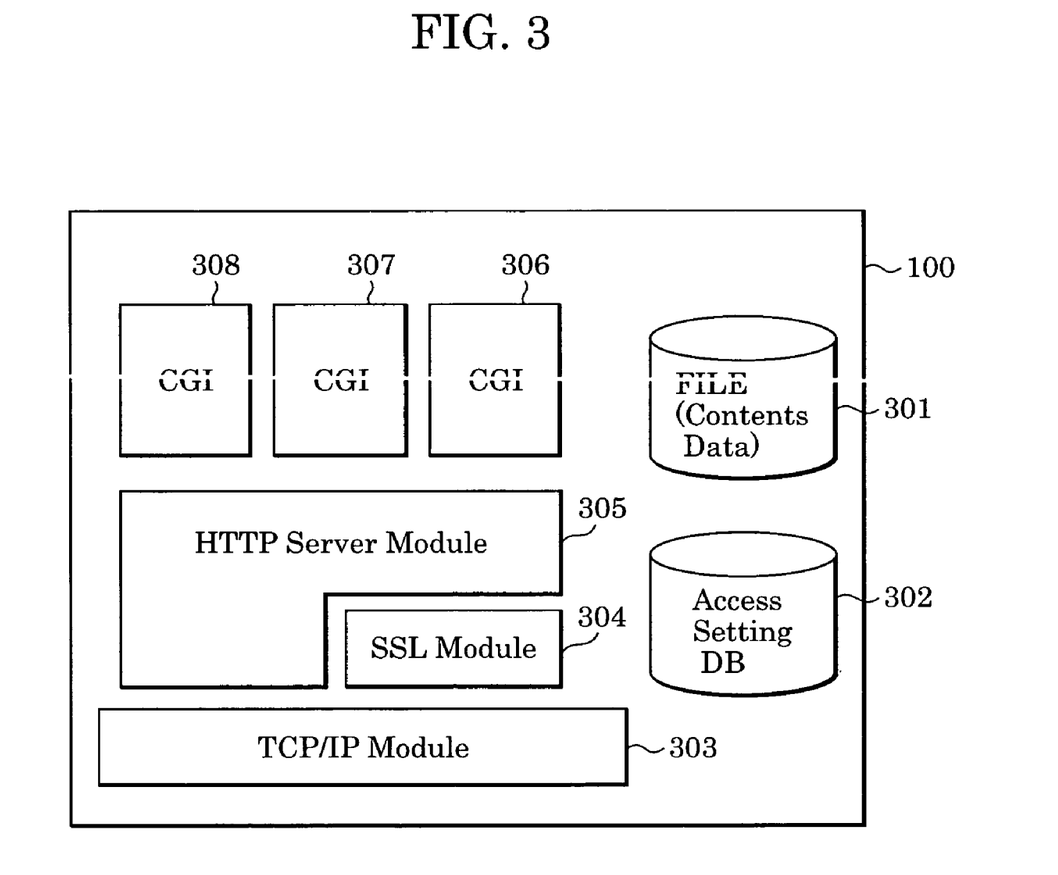
FIG. 3 shows an exemplary arrangement of software modules of the WEB server shown in FIG. 1.

FIG. 3 shows a software module arrangement of the WEB server 100.

A file system 301 is a file system for storing contents data which the WEB server 100 offers for distribution to the client PCs 200 and 210. An access setting information database 302 is a database which stores setup information required for the WEB server 100 to provide information or service, and authentication account information required for the WEB server 100 to perform authentication processing, etc.

A TCP/IP module 303 is a module for performing TCP/IP (transmission control protocol/Internet protocol) communication. The TCP/IP module 303 performs analysis or generation of an IP packet and a TCP packet. TCP/IP module 303 attaches a TCP header and an IP header to the data from the module of a high order, removes a TCP header and an IP header from the data from a network, and passes subsequent data to the module of a high order.

An SSL (Secure Sockets Layer) module 304 is a module for performing encryption communication. SSL is a protocol for encrypting, transmitting and receiving information over the Internet.

SSL can prevent tapping, falsification and spoofing of data by using a security technology using a combination of a public key encryption, a secret key encryption, a digital certificate, a hash function, etc.

The SSL module is a module of the high order of the TCP/IP module.

The protocol of encryption communication is not restricted to SSL. For example, TLS (Transport Layer Security) which is a successor to SSL may be used.

An HTTP server module 305 is a server module for performing offer of freedom of information or service using HTTP (Hyper Text Transfer Protocol). CGI (Common Gateway Interface) modules 306, 307, and 308 are modules which perform predetermined data processing and provide service to the client PCs 200 and 210. The CGI modules 306, 307, and 308 operate on the HTTP server module 305, or are raised from the HTTP server module 305, and operate.

If the WEB server 100 receives a request for information or a request for service from a client PC 200 or 210, the request will be transmitted to the HTTP server module 305 via the TCP/IP module 303 or the SSL module 304. The HTTP server module 305 analyzes the request, refers to setup information and performs processing corresponding to the request. The authentication processing in the WEB server 100 is performed by the HTTP server module 305 or the CGI module 306.

Figure 4:
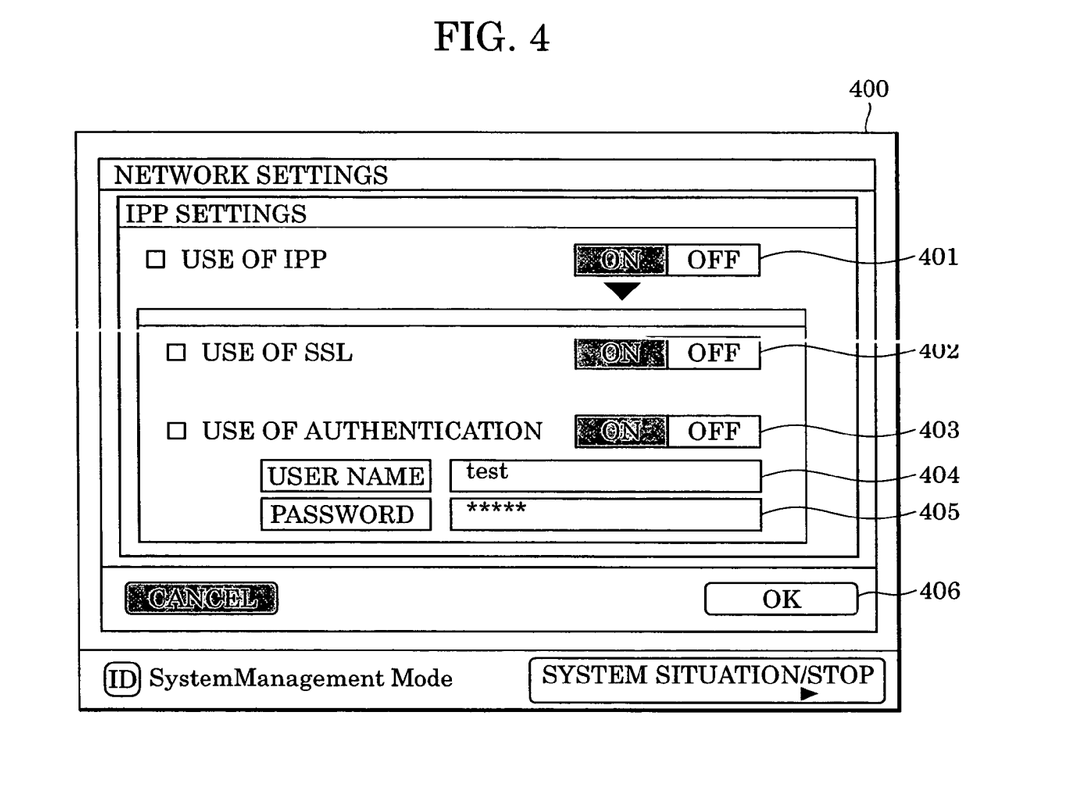
FIG. 4 shows an example authentication setting screen for authentication processing performed by the WEB server.

FIG. 4 shows an example of an authentication setting screen for the authentication processing performed by the WEB server 100 performs.

The WEB server 100 displays an authentication setting screen 400 via a display etc. A user performs a setup for the authentication function of the WEB server 100 by entering information via the setting screen 400. For example, description is provided here for using the setting screen 400 in the authentication processing performed when the WEB server 100 provides IPP (Internet Printing Protocol) service to the client PCs 200 and 210. The IPP service is provided by the CGI module 306.

An IPP selection button 401 is used for selecting whether the IPP service is provided in the WEB server 100 (IPP is provided in cases where "ON" is selected and IPP is not provided in cases where "OFF" is selected).

When the IPP service is provided, an SSL button 402 is used for selecting whether the WEB server 100 communicates using HTTP and SSL (in cases where "ON" is selected) or only using HTTP (in cases where "OFF" is selected). If only using HTTP is selected ("OFF" is selected for SSL button 402), when the WEB server 100 provides the IPP service for the client PC 200 or 210, encryption communication which SSL uses is not performed between the WEB server 100 and the client PC 200 or 210.

An authentication button 403 is a button for selecting whether to perform authentication processing when a user uses the IPP service with the client PC 200 or 210. If "ON" is selected, authentication processing is performed and if "OFF" is selected, authentication is not performed.

A name box 404 and a password box 405 are boxes for setting up the user name and password, respectively, which are used for authentication. The user name and password entered here are used by authentication processing.

The difference between FIG. 4 and FIG. 12 is that there is no selection button in FIG. 4 for choosing the authentication method (e.g., Basic or Digest). In the WEB server 100, the WEB server 100 automatically determines the authentication method according to the contents of the setting screen, without a user having to choose the authentication method.

<A First Automatic Determination Process for an Authentication Method>

Figure 5:
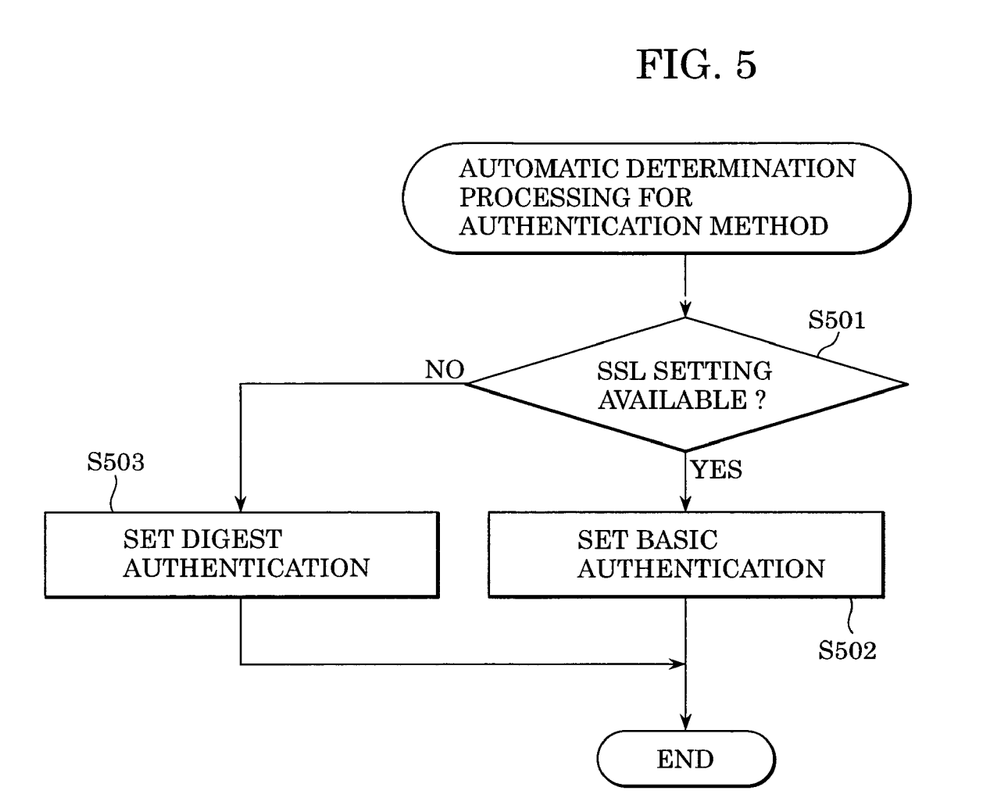
FIG. 5 is a flowchart which shows processing of a first automatic determination process in which the WEB server 100 determines an authentication method according to the contents set using an authentication setting screen such as the one shown in FIG. 4.

FIG. 5 is a flowchart which shows a first automatic determination process in which the WEB server 100 determines an authentication method according to the contents set by using an authentication setting screen such as the one shown in FIG. 4.

The first automatic determination processing is performed when the CPU 201 of the WEB server 100 executes a program based on the flowchart of FIG. 5.

In cases where a user pushes an OK button 406 of the setting screen 400 of FIG. 4, it is determined whether the WEB server 100 has an available setup of SSL (step S501).

In cases where SSL is available (yes in step S501), the Basic authentication method is selected as an authentication method, and the Basic authentication method is registered into the access setting information database 302 as the authentication method of IPP service (step S502). In cases where SSL is not available (no in step S501), the Digest authentication method is selected as the authentication method, and the Digest authentication method is registered into the access setting information database 302 as the authentication method of the IPP service. After selection and registration of the appropriate authentication method (Basic authentication in step S502 or Digest authentication in step S503), processing ends.

Descriptions of authentication processing based on the Basic authentication method and authentication processing based on the Digest authentication method are provided later.

Figure 6:
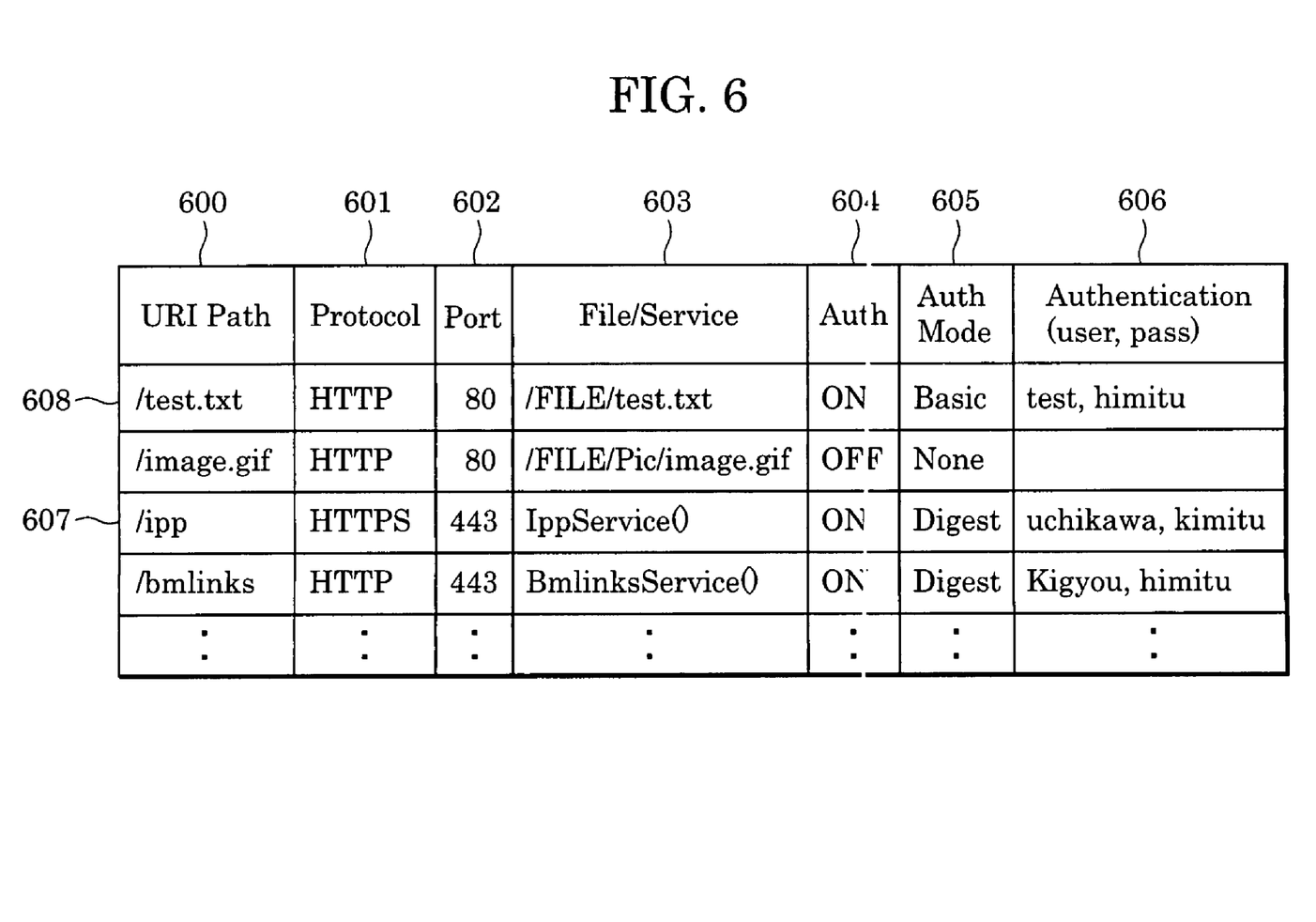
FIG. 6 shows an exemplary access setting information database accessible by the WEB server.

FIG. 6 shows exemplary data stored in the access setting information database 302 of the WEB server 100.

A URI path column 600 includes the URI (Uniform Resource Identifier) path information corresponding to the service which can be requested. A request specifying path information not existing in the URI path column 600 is not receivable. For example, "/ipp" 607 is the URI path information corresponding to the IPP service. In the setting screen 400 of FIG. 4, when IPP service was enabled, in cases where it is selected, "/ipp" is registered into the access setting information database 302 (see row 607 of FIG. 6).

Protocol information which shows the protocol used with each service is stored in a protocol column 601. In cases where HTTP is specified, access by HTTP is possible. In cases where HTTPS is specified, only access by HTTP and SSL is possible. In FIG. 6, "HTTPS" is specified as the protocol for the IPP service. In the setting screen 400 of FIG. 4, in cases where use of SSL is selected, "HTTPS" is registered.

A port number corresponding to the URI path is stored in a port column 602. The port number which permits connection with the system resource specified with the URI path is indicated in the port column 602. In the example shown in FIG. 6, since the port number of the IPP service is 443, the request to the IPP service is transmitted to a port number "443."

The information which shows the location of the system resource corresponding to the URI path is stored in a file/service column 603. The system resource is a file which the WEB server 100 holds, or is the CGI module which operates on the HTTP server module of the WEB server 100. In cases where the IPP service is required, the CGI module of the name called "IppService" is activated.

Whether authentication is required is stored in an authentication column 604. "ON" means that the authentication is necessary, and "OFF" means that the authentication is not necessary. In the example shown in FIG. 6, "ON" is stored in the authentication column 604 for the IPP service. In the setting screen of FIG. 4, in cases where execution of authentication is selected (authentication button 403 is set to "ON"), "ON" is registered in the authentication column 604.

The information which shows the authentication method (mode) in cases in which authentication is performed ("ON" in authentication column 604) is stored in an authentication mode column 605. The authentication method selected at step S502 or S503 of FIG. 5 is registered into the authentication mode column 605. In FIG. 6, "Basic" means the Basic authentication method and "Digest" means the Digest authentication method. "None" is stored in cases where authentication is not performed ("OFF" in authentication column 604).

The user name and password which are used by the authentication process are stored in a user name/password column 606. Access to service is only permitted in cases where these user names and passwords are specified in the authentication processing. When authentication in not required for a service ("OFF" in authentication column 604), a user name/password is not required in the user name/password column 606 for that service. The user name and password which were entered in the setting screen of FIG. 4 in the username box 404 and the password box 405, respectively, are stored in column 606.

In the example shown in FIG. 6, in row 608, in cases where the WEB server 100 receives the request to port number 80 which specified the path "/test.txt" using the HTTP protocol, the WEB server 100 requires authentication by the BASIC authentication of the client PC. In such cases, if the WEB server 100 receives "test" and "himitu" from the client PC 200 or 210 as a user name and password, respectively, the WEB server 100 permits access to "/FILE/test.txt" to the requesting client PC 200 or 210.

As described above, corresponding to service, the information on a communication condition and authentication conditions is stored in the access setting information database 302.

Figure 7:
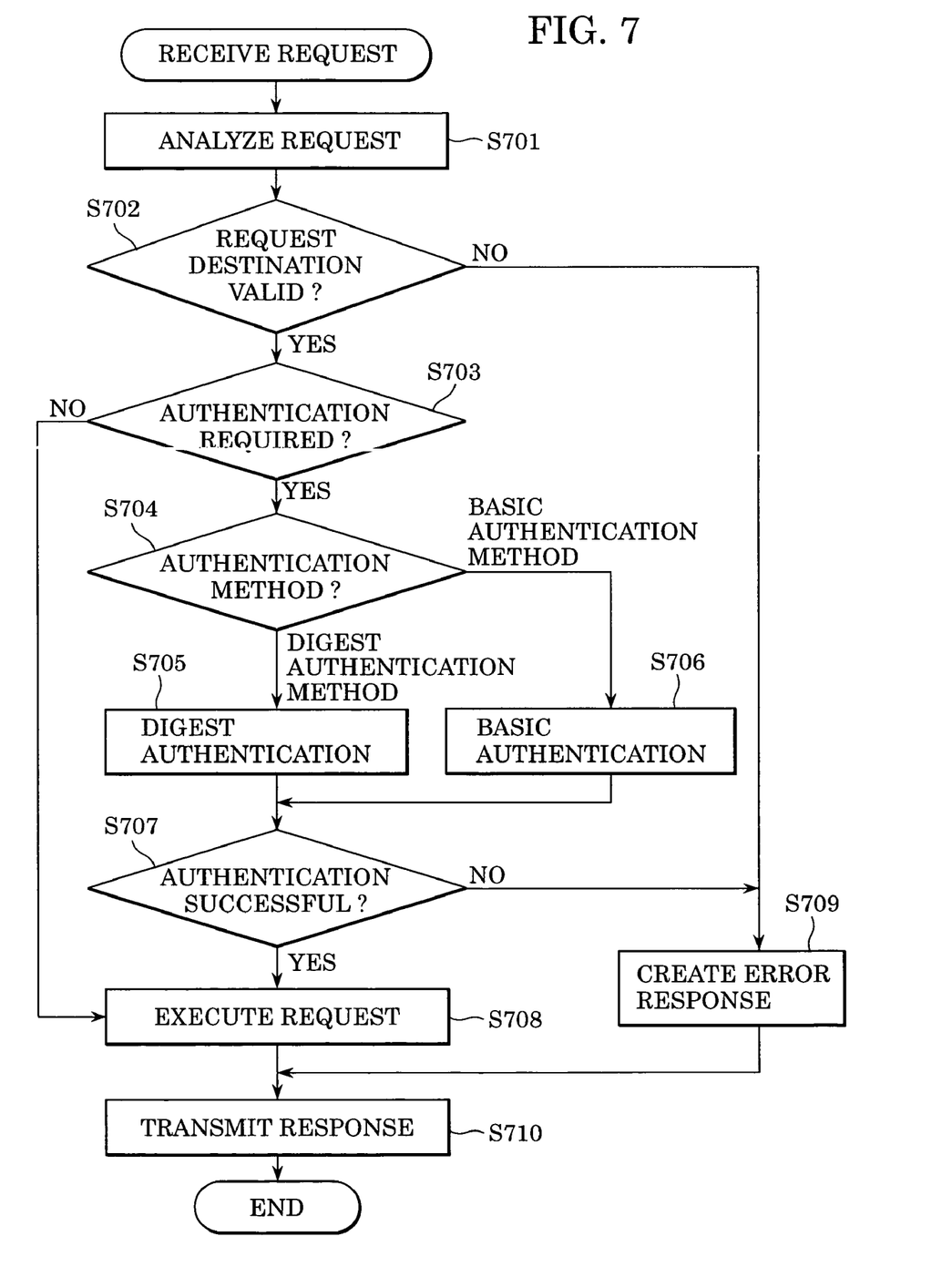
FIG. 7 is a flowchart which shows processing performed when the WEB server receives a request.

FIG. 7 is a flowchart which shows the processing performed when the WEB server 100 receives a request. This processing is performed when the CPU 201 of the WEB server 100 executes a program based on the flowchart of FIG. 7.

If a data request is received from a client PC 200 or 210, the HTTP server module 305 analyzes header information of the request data, and acquires the URI path information specified by the request (step S701).

In step S702, it is determined whether the request is valid. More specifically, it is determined whether the URI path information acquired from the request in step S701 exists in the access setting information database 302. If the request is valid (yes in step S702), processing proceeds to step S703, otherwise (no in step S702), processing proceeds to step S709.

In step S703, it is determined whether authentication is required based on the authentication column 604 of the access setting information database 302 for the URI path specified in the request. If the authentication column 604 for the URI path specified in the request is set to "ON" (yes in step S703), processing proceeds to step S704. If the authentication column 604 for the URI path specified in the request is not set to "ON", i.e., is set to "OFF" (no in step S703), processing proceeds to step S708.

In step S704, the authentication method is determined by checking the authentication mode column 605 of the access setting information database 302. If it is determined in step S704 that the authentication method for the URI path is the Basic authentication method, processing proceeds to step S706 to perform the Basic authentication method. If it is determined in step S704 that the authentication method for the URI path is the Digest authentication method, processing proceeds to step S705 to perform the Digest authentication method.

After the appropriate authentication method has been performed (Basic authentication method in step S706 or Digest authentication method in step S705), processing proceeds to step S707 to determine whether the authentication processing was successful (step S707). If it is determined in step S707 that the authentication processing was successful, processing proceeds to step S708, and if it is determined in step S707 that the authentication processing was not successful, processing proceeds to step S709.

In step S708, processing based on the request from the client PC 200 or 210 is performed. Processing then proceeds to step S710 and the result of the processing performed in step S708 is transmitted as a response. Processing then ends.

On the other hand, in step S709, error response data according to the generated error is created. Processing then proceeds to step S710 and the error response data created in step S709 is transmitted as a response. Processing then ends.

In the above-described embodiment, although the authentication method was selected according to use of authentication ("ON" or "OFF" of authentication button 403 in FIG. 4), other methods may be used to select the authentication method. For example, the authentication method may be selected according to the method of encryption communication. For example, when a protocol with high intensity of encryption is set up, Basic authentication may be performed, and when a protocol with low intensity of encryption is set up, Digest authentication may be performed.

<A Second Automatic Determination Process for an Authentication Method>

In the first automatic determination process, when a setup was performed in the authentication setting screen, the authentication method was determined, but in the second automatic determination process, the authentication method is determined when the request from the client PC 200 or 210 is received.

Figure 8:
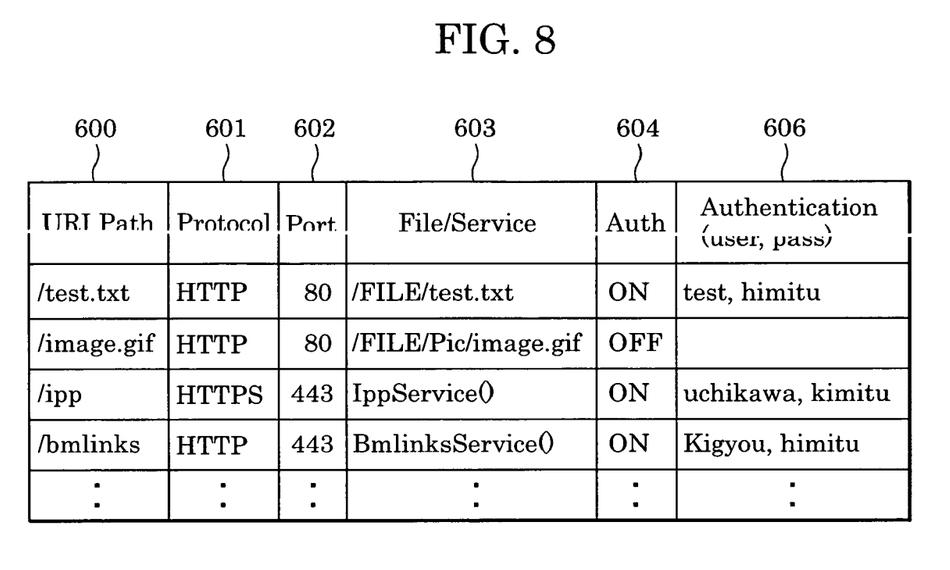
FIG. 8 shows an access setting information database used by a second automatic determination process for determining an authentication method.

FIG. 8 shows the access setting information database 302 used by the second automatic determination process. The difference between the access setting information database 302 of FIG. 6 and the access setting information database of FIG. 8 is that the authentication mode column 605 of FIG. 6 does not exist in FIG. 8 because the authentication method is automatically determined in the second automatic determination processing when the WEB server 100 receives the request. Because the other data in the access setting information database 302 (column 600, 601, 602, 603, 604 and 606) is the same as in FIG. 6 (described above), description thereof will not be repeated here.

Figure 9:
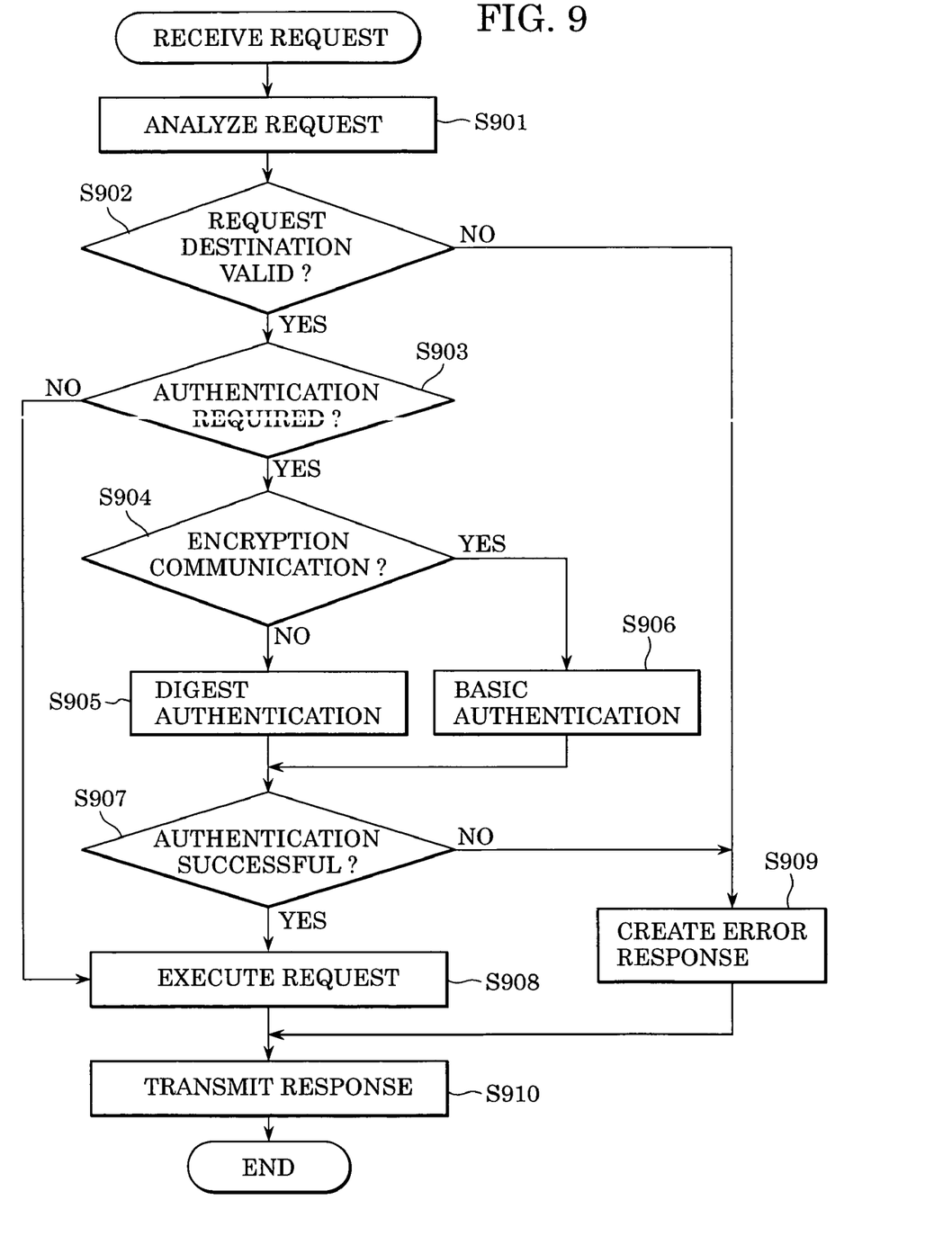
FIG. 9 is a flow chart which shows a second automatic determination process in which an authentication method is determined when the WEB server receives a request.

FIG. 9 is a flowchart which shows the second automatic determination processing in which an authentication method is determined when the WEB server 100 receives a request. The second automatic determination processing is performed when the CPU 201 of the WEB server 100 executes a program based on the flowchart of FIG. 9.

If the request data is received from the client PC 200 or 210, the HTTP server module 305 analyzes the header information of the request data, and acquires the URI path information specified by the request (step S901).

In step S902, it is determined whether the destination is valid, i.e., whether the URI path information acquired from the request in step S901 exists in the access setting information database 302. If it is determined in step S901 that the requested destination is valid (yes in step S902), processing proceeds to step S903 and if it is determined in step S901 that the requested destination is not valid (no in step S902), processing proceeds to step S909.

In step S903, it is determined whether authentication is required. The authentication column 604 of the access setting information database 302 is checked for the specified URI path. If the authentication column 604 is set to "ON" (authentication is required in this case), processing proceeds to step S904, otherwise (the authentication column 604 is set to "OFF" and authentication is not required in this case), processing proceeds to step S908 and processing according to the request is performed.

In step S904, it is determined whether the request was communicated by an encryption communication. Whether the request was communicated by an encryption method is determined based on at least one of the following three methods.

The first determination method checks the protocol column 601 of the access setting information database 302. In cases where HTTPS is registered as a protocol corresponding to the specified URI path information, it is determined that encryption communication is performed, and in cases where HTTP is registered, it is determined that encryption communication is not performed.

The second determination method determines that encryption communication is performed in cases where the HTTP server module 305 receives request data from the SSL module 304. In cases where the HTTP server module 305 receives request data from the TCP/IP module 303, it is determined that encryption communication is not performed.

The third determination method determines that the encryption communication is performed in cases where the port number which received the request is a port number to which encryption communication is to be performed. In cases where it is a port number to which encryption communication is not to be performed, it determines that encryption communication is not performed. If the third determination method is used, the port number to which encryption communication is performed is decided beforehand. The port number of the port where encryption communication is performed may be defined by specification or may be specified by the user, e.g., by using the KB 209.

In step S904, if it is determined that encryption communication is performed, the authentication processing based on the Basic authentication method is performed (step S906). In cases where it is determined that the encryption communication is not performed, the authentication processing based on the Digest authentication method is performed (step S905).

After authentication is performed (Basic authentication in step S906) or Digest authentication in step S905), processing proceeds to step S907. In step S907 it is determined whether the authentication processing was successful. If it is determined in step S907 that the authentication processing was successful, processing proceeds to step S908, and if it is determined in step S907 that the authentication processing was not successful, processing proceeds to step S909.

In step S908, processing based on the request from the client PC 200 or 210 is performed. Processing then proceeds to step S910 and the result of the processing performed in step S907 is transmitted as a response. Processing then ends.

On the other hand, in step S909, the error response data according to the generated error is created. Processing then proceeds to step S910 and the error response data created at step S909 is transmitted as a response. Processing then ends.

<Authentication Processing Based on the Basic Authentication Method>

Figure 10:
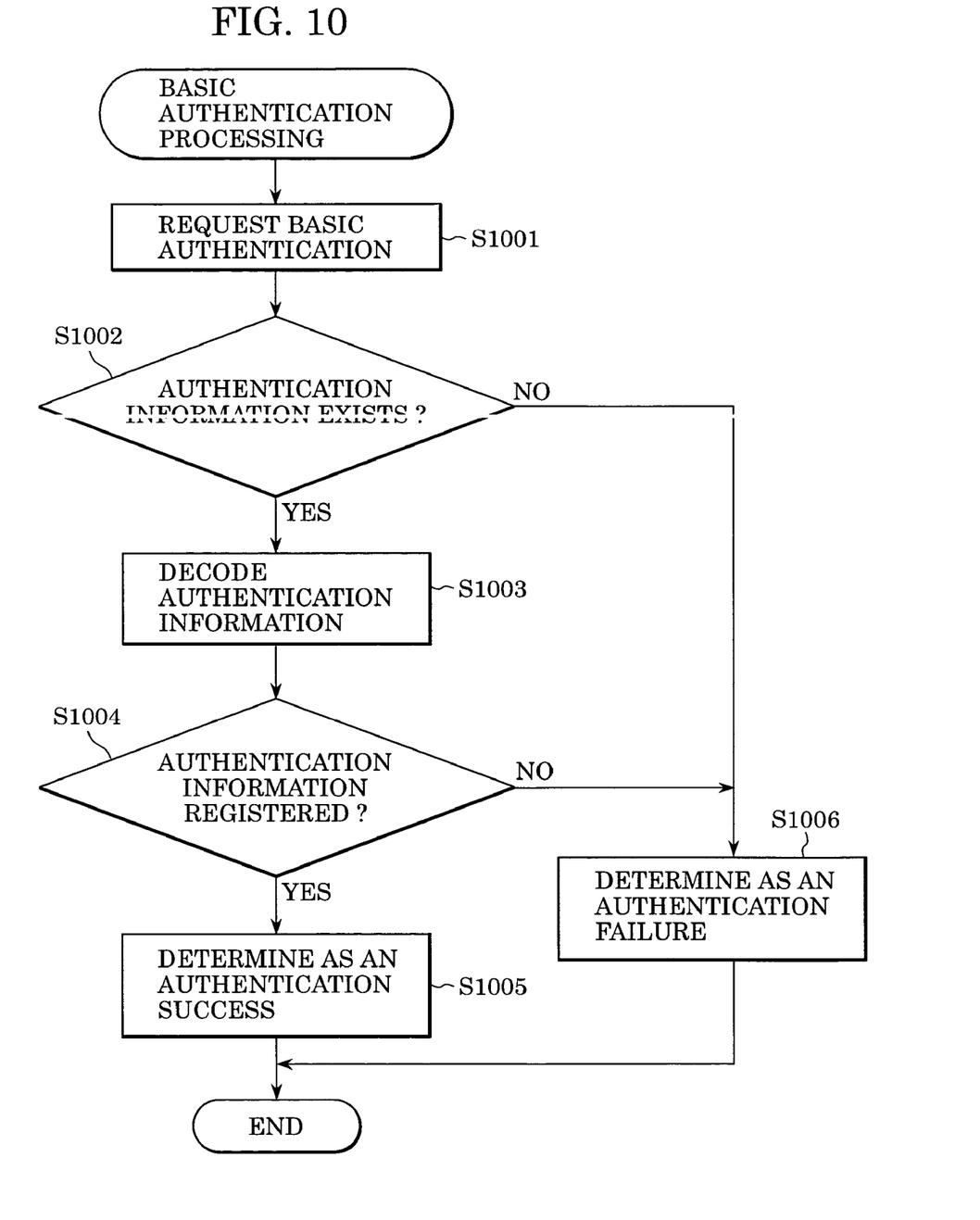
FIG. 10 is a flowchart which shows authentication processing based on a Basic authentication method.

FIG. 10 is a flowchart which shows authentication processing based on the Basic authentication method. The Basic authentication processing is performed in step S706 of FIG. 7, or step S906 of FIG. 9. The Basic authentication processing is performed when the CPU 201 of the WEB server 100 executes a program based on the flowchart of FIG. 10.

Since authentication information is not set to request data from the client PC 200 or 210, the WEB server 100 transmits a response message to the client PC 200 or 210 requesting Basic authentication (step S1001).

Upon receipt of the request for Basic authentication, the client PC 200 or 210 displays an input screen for entering a user name and password. After the user enters the user name and password, the client PC 200 or 210 transmits the request to which the authentication information was added to the WEB server 100. The transmitted request includes the user name and password input by the user. In exemplary embodiments, the data connecting the user name and password (e.g., by a ":") is converted using Base 64 code.

If the WEB server 100 receives a request from the client PC 200 or 210, it is determined in step S1002 whether authentication information exists (i.e., whether authentication information is included in the request received from the client PC). If it is determined in step S1002 that authentication information exists, processing proceeds to step S1003. If it is determined in step S1002 that authentication information does not exist, processing proceeds to step S1006 and an authentication failure has occurred. Processing then ends.

In cases where the authentication can be found (yes in step S1002), the authentication information is decoded (step S1003) and the user name and password in the authentication information of the request are compared to valid user name/password combinations that are registered in the access setting information database 302 (step S1004).

If it is determined that the authentication information in the request is registered (yes in step S1004), the authentication was successful (step S1005). Otherwise, (no in step S1004), the authentication was failure (S1006). Processing then ends.

<Authentication Processing Based on the Digest Authentication Method>

Figure 11:
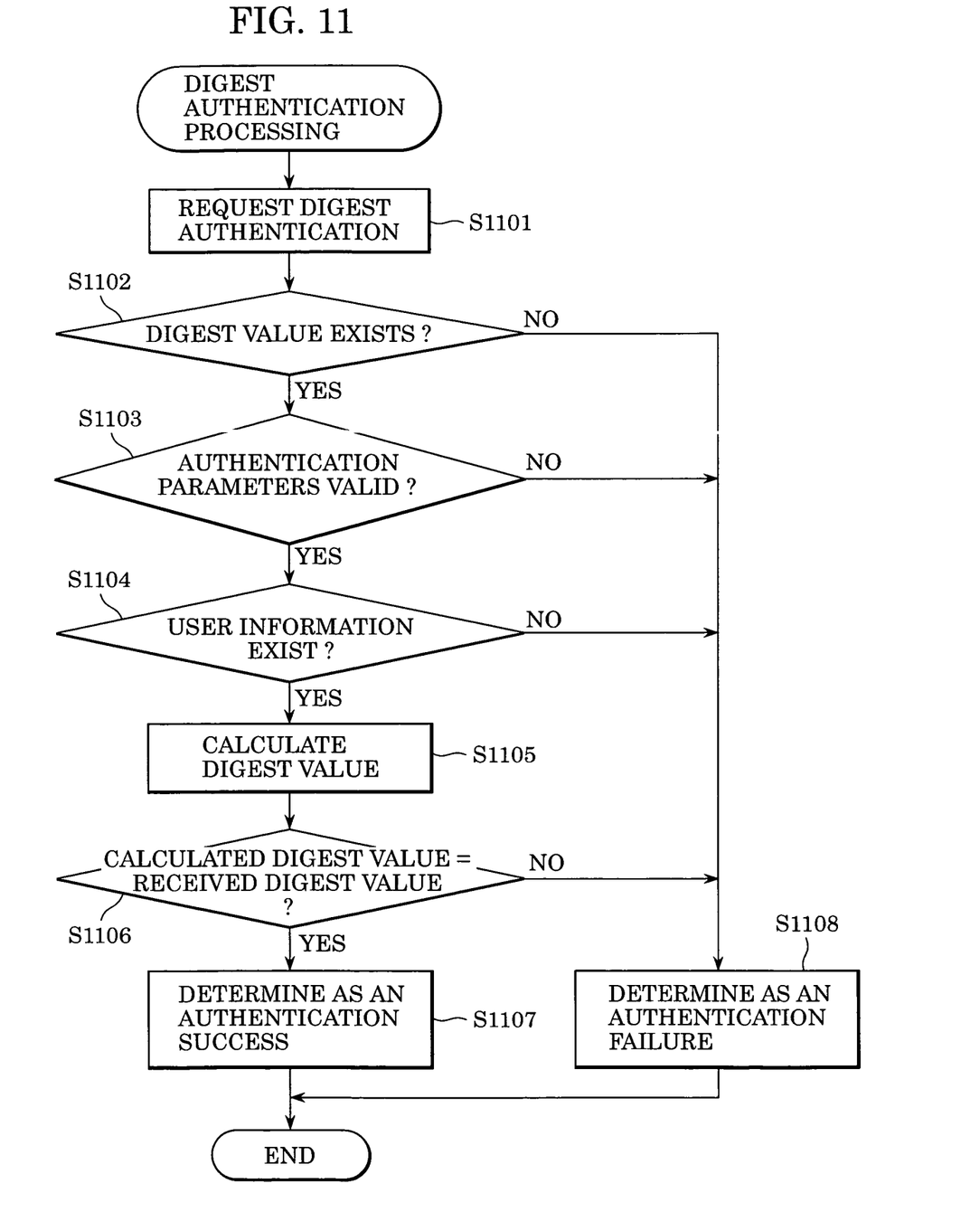
FIG. 11 is a flowchart which shows authentication processing based on a Digest authentication method.

FIG. 11 is a flowchart which shows the authentication processing based on a Digest authentication method. The Digest authentication processing is performed in step S705 of FIG. 7, or step S905 of FIG. 9. The Digest authentication processing is performed when the CPU 201 of the WEB server 100 executes a program based on the flowchart of FIG. 11.

Since authentication information is not set to request data from the client PC 200 or 210, the WEB server 100 transmits a request message to the client PC 200 or 210 requesting Digest authentication (step S1101). The request message includes a nonce value. A nonce is a parameter that varies with time. For example, a nonce can be a time stamp or a special marker intended to limit or prevent the unauthorized replay or reproduction of a file. Because a nonce changes with time, it is easy to tell whether or not an attempt at replay or reproduction of a file is legitimate by comparing the current time with the nonce. If it does not exceed it or if no nonce exists, then the attempt is authorized. Otherwise, the attempt is not authorized.

Upon receipt of the request for Digest authentication, the client PC 200 or 210 displays an input screen for entering a user name and a password.

The client PC 200 or 210 computes a Digest value from the authentication information which includes the user name and password input by the user. The Digest value also includes the nonce value received from the WEB server 100 and the requested URI path. The client PC transmits the request to which the HTTP header including the Digest value was added to the WEB server 100.

If the WEB server 100 receives a request from the client PC 200 or 210, it is determined in step S1102 whether the Digest value exists (is in the request received from the client PC). In cases where the Digest value cannot be found (no at step S1102), processing proceeds to step S1108 and the request is determined to be an authentication failure. Processing then ends.

In cases where the Digest value can be found (yes at step S1102), it is determined whether other authentication parameters are the valid (step S1103). If it is determined in step S1103 that other authentication parameters are not valid, processing proceeds to step S1108 and authentication is determined to have failed. Processing then ends.

If it is determined in step S1103 that other authentication parameters are valid, processing proceeds to step S1104. In step S1104, the access setting information database 302 is checked and it is determined whether the user name and password exist (are in the access setting information database 302). If it is determined that the user information does not exist (no at step S1104), processing proceeds to step S1108 and authentication is determined to have failed. Processing then ends.

If it is determined that the user information exists (yes at step S1104), processing proceeds to step S1105. In step S1105, the Digest value is computed from the authentication information which includes the user name and password which are registered in the access setting information database 302, the nonce value, and the requested URI path. Processing then proceeds to step S1106 and the Digest value received from the client PC 200 or 210 is compared with the Digest value computed in step S1105. If the Digest value computed in step S1106 matches the Digest value received in the request from the client PC 200 or 210 (yes at step S1106), identity, authentication processing is determined to have been successful (step S1107) and processing ends. If the Digest value computed at step S1106 does not match the Digest value received in the request from the client PC 200 or 210 (no at step S1106), authentication processing is determined to have been a failure (step S1108) and processing ends.

The present invention can be applied to an apparatus comprising a single device or to system including a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code.

In this case, so long as the system or apparatus has the functions of the program, the program may be executed in any form, such as object code, a program executed by an interpreter, or script data supplied to an operating system (OS).

Example of storage media that can be used for supplying the program include a floppy disk, a hard disk, an optical disk, a magneto-optical disk, a CD-ROM (compact disk-ROM), a CD-R (CD-recordable), a CD-RW (CD-rewritable), a magnetic tape, a non-volatile type memory card, a ROM, and a DVD (digital versatile disk, e.g., a DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words a WWW (World Wide Web) server may download, to multiple users, the program files that implement the functions of the present invention by computer.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information to install the program in the user computer.

Besides the cases where the aforementioned functions according to the embodiments are implemented by executing the read program by computer and an operating system or the like running on the computer may perform all or a part of the actual processing so that the functions of the foregoing embodiments can be implemented by this processing.

After the program is read from the storage medium it can be written to a function expansion board inserted into the computer or to a memory provided in a function expansion unit connected to the computer. A CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims priority from Japanese Patent Application No. 2004-193472 filed Jun. 30, 2004, which is hereby incorporated by reference herein.

What is claimed is:

1. An information processing apparatus that can communicate with an external apparatus, the information processing apparatus comprising:
   a setting unit configured to set up an encryption communication condition indicating that encryption communication is used for communication with the external apparatus or an encryption communication condition indicating that encryption communication is not used for communication with the external apparatus, based on a designation from a user;
   a storage unit configured to store the encryption communication condition set by the setting unit; and
   a selecting unit configured to select, in accordance with the encryption communication condition indicating that encryption communication is not used, a first authentication method that encrypts authentication information used for authentication, and select, in accordance with the encryption communication condition indicating that encryption communication is used, a second authentication method that does not encrypt the authentication information used for authentication.

2. An information processing apparatus according to claim 1, wherein:
   the storage unit further stores information for relating information of the authentication method selected by the selecting unit with at least one of a plurality of services, and
   the information processing apparatus further comprises:
   a request receiving unit configured to receive a request from the external apparatus;
   an authentication processing determination unit configured to determine authentication processing to be performed for a service specified in the request received by the request receiving unit based on the information stored in the storage unit; and
   an authentication processing unit configured to perform the authentication processing determined by the authentication processing determination unit.

3. An information processing apparatus according to claim 1, wherein the second authentication method includes a Basic authentication method and the first authentication method includes a Digest authentication method.

4. An information processing apparatus according to claim 1, further comprising a registering unit configured to register authentication information input by the user, wherein the authentication information registered by the registering unit is used regardless of the authentication method selected by the selecting unit.

5. An information processing apparatus according to claim 1, wherein encryption communication uses Secure Sockets Layer.

6. An information processing apparatus according to claim 1, wherein encryption communication uses Transport Layer Security.

7. An information processing apparatus that can communicate with an external apparatus, the information processing apparatus comprising:
- a receiving unit configured to receive data from the external apparatus;
- a storage unit configured to store the data received by the receiving unit;
- a determination unit configured to determine whether the data stored in the storage unit was communicated using encryption communication; and
- a selecting unit configured to select, in accordance with the stored data being not communicated using encryption communication, a first authentication method that encrypts authentication information used for authentication, and to select, in accordance with the stored data being communicated using encryption communication, a second authentication method that does not encrypt the authentication information used for authentication.

8. An information processing apparatus according to claim 7, wherein the determination unit determines whether the data received by the receiving unit was communicated using the encryption communication based on a protocol used by the receiving unit to receive the data from the external apparatus.

9. An information processing apparatus according to claim 7, wherein the determination unit determines whether the data received by the receiving unit was communicated using the encryption communication based on a port number used by the receiving unit to receive the data from the external apparatus.

10. An information processing method performed by an information processing apparatus that can communicate with an external apparatus, the information processing method comprising steps of:
- setting up an encryption communication condition indicating that encryption communication is used for communication with the external apparatus or an encryption communication condition indicating that encryption communication is not used for communication with the external apparatus, based on a designation from a user;
- storing the encryption communication condition; and
- selecting, in accordance with the stored encryption communication condition indicating that encryption communication is not used, a first authentication method that encrypts authentication information used for authentication, and selecting, in accordance with the stored encryption communication condition indicating that encryption communication is used, a second authentication method that does not encrypt the authentication information used for authentication.

11. A storage medium for storing program code for an information processing method according to claim 10.

12. An information processing method performed by an information processing apparatus that can communicate with an external apparatus, the information processing method comprising steps of:
- receiving data from the external apparatus;
- storing the data received by the receiving unit;
- determining whether the stored data was communicated using encryption communication; and
- selecting, in accordance with the stored data being not communicated using encryption communication, a first authentication method that encrypts authentication information used for authentication, and selecting, in accordance with the stored data being communicated using encryption communication, a second authentication method that does not encrypt the authentication information used for authentication.

13. A storage medium for storing program code for an information processing method according to claim 12.

* * * * *